US009319273B2

(12) United States Patent
Schwarze et al.

(10) Patent No.: US 9,319,273 B2
(45) Date of Patent: Apr. 19, 2016

(54) POLICY COORDINATION BETWEEN POLICY ENFORCEMENT POINTS

(71) Applicant: Hewlett-Packard Development Company, L.P., Houston, TX (US)

(72) Inventors: Martin Schwarze, Burnaby (CA); Mu-Jin Liu, Shanghai (CN); Zhi-Jie Dai, Shanghai (CN); Bo Wang, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 550 days.

(21) Appl. No.: 13/715,753

(22) Filed: Dec. 14, 2012

(65) Prior Publication Data

US 2014/0136674 A1    May 15, 2014

(51) Int. Cl.
*G06F 15/16* (2006.01)
*H04L 12/24* (2006.01)
*H04W 76/02* (2009.01)
*H04W 88/16* (2009.01)

(52) U.S. Cl.
CPC ........ *H04L 41/0816* (2013.01); *H04L 41/5019* (2013.01); *H04W 76/022* (2013.01); *H04W 88/16* (2013.01)

(58) Field of Classification Search
CPC ............ H04L 41/0816; H04L 41/5003; H04L 41/5019; H04L 41/5025; H04W 76/022; H04W 88/16
See application file for complete search history.

(56) References Cited

U.S. PATENT DOCUMENTS

| 8,429,268 | B2 * | 4/2013 | Riley et al. ................... 709/224 |
| 8,458,767 | B2 * | 6/2013 | Riley et al. ........................ 726/1 |
| 8,498,959 | B2 * | 7/2013 | Almeida et al. ................ 706/55 |
| 2008/0229385 | A1 * | 9/2008 | Feder et al. ........................ 726/1 |
| 2011/0022702 | A1 * | 1/2011 | Riley et al. ................... 709/224 |
| 2011/0219426 | A1 * | 9/2011 | Kim et al. .......................... 726/1 |
| 2011/0225281 | A1 * | 9/2011 | Riley et al. ................... 709/223 |
| 2012/0081557 | A1 * | 4/2012 | Kupinsky et al. .......... 348/207.1 |
| 2012/0239816 | A1 * | 9/2012 | Carnero Ros et al. ........ 709/227 |
| 2014/0136674 | A1 * | 5/2014 | Schwarze et al. ............. 709/223 |

FOREIGN PATENT DOCUMENTS

WO    WO-2012/063106 A1    5/2012
WO    WO-2012/065657 A1    5/2012

OTHER PUBLICATIONS

"The Business Case for an Integrated Policy and Charging Control (PCC) Solution in the Multimedia Core", < http://www.cisco.com/en/US/solutions/collateral/ns341/ns973/ns1081/PCC_TCO_Whitepaper.pdf >.

* cited by examiner

*Primary Examiner* — Lance L Barry
(74) *Attorney, Agent, or Firm* — Mannava & Kang, P.C.

(57) ABSTRACT

According to an example, a unified policy management system may include a session manager module to establish sessions with policy enforcement points. A notification manager module may receive an event trigger notification from a policy enforcement point via an interface session. A coordination engine may determine whether an event identified from the event trigger notification is to cause a change in policy enforced by another policy enforcement point and facilitate the change via another interface session.

15 Claims, 6 Drawing Sheets

POLICY COORDINATION BETWEEN POLICY ENFORCEMENT POINTS

BACKGROUND

In some situations, different types/levels of policies are enforced for different applications or devices or users in a network. For example, different policies may be enforced for different types of subscribers or for different services provided in a mobile network. Also, in some instances, enforcement of one policy may impact other polices that are to be enforced.

BRIEF DESCRIPTION OF DRAWINGS

The embodiments are described in detail in the following description with reference to examples shown in the following figures.

DETAILED DESCRIPTION OF EMBODIMENTS

Figure 1:
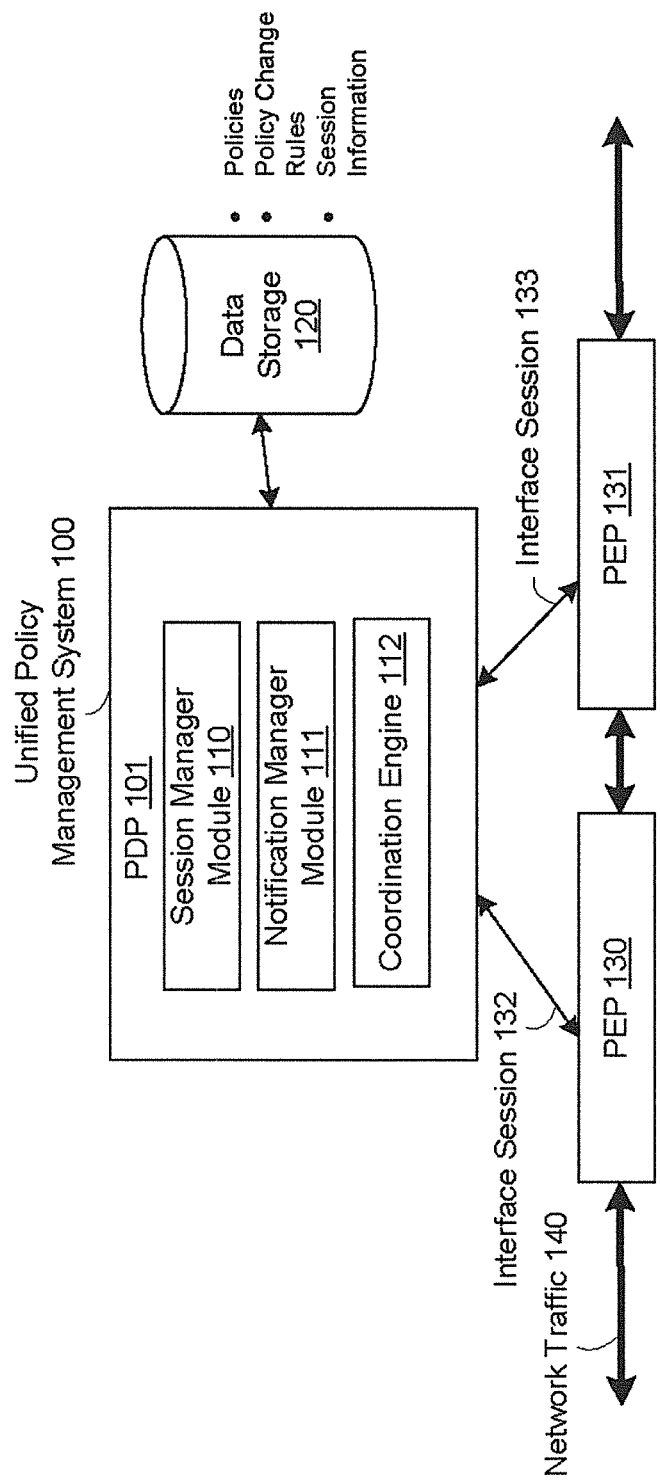
FIG. 1 illustrates a Unified Policy Management (UPM) system.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a Unified Policy Management (UPM) system manages policies between policy enforcement points (PEPs) that enforce policies. The polices may be for different services, users (subscribers), etc., in a network. The UPM system and the PEPs may be employed in a packet-based network to enforce the policies. For example, for each received packet, the PEP checks the packet against service data flow filters. When a packet matches a service data flow filter, the policy for that packet is applied.

In one example, the UPM system and the PEPs are employed in a 3rd Generation Partnership Project (3GPP) network to enforce user or service layer policies. The PEPs may be policy and charging enforcement functions (PCEFs). Examples of the policies may include enforcing different quality of service (QoS) limitations for different subscribers (e.g., bearer level QoS). For example, bearer level QoS policies define the policies for all of the packets passing through the bearer. Other policies may be service level policies associated with layers 1-3 of the Open Systems Interconnection (OSI) model or associated with layers 4-7 with the help of deep packet inspection. These policies may include peer-to-peer (P2P) service policies.

The UPM system may be used in a General Packet Radio Service (GPRS), Universal Mobile Telecommunications System (UMTS) or a Long Term Evolution (LTE) network. In one example, a PCEF is included in a gateway service node. The gateway service node may be a routing point between a mobile network, such as a Global System for Mobile (GSM) network (e.g., 2G, 3G, 4G), and the Internet or some other Internet Protocol (IP) network. The gateway service node may be in a a gateway GPRS support node (GGSN) for example for a 3G GPRS network or a packet data gateway (PGW) for 4G LTE network. Another PCEF may be in a deep packet inspection (DPI) device. The gateway service node may enforce QoS based policies for subscribers, such as bandwidth allocated to a subscriber's session. The DPI device performs deep packet inspection and may determine what service a particular packet belongs to from the inspection. The DPI device may enforce service layer policies based on services determined from inspected packets. In one example, a policy may indicate whether a subscriber is entitled to a service and to allow or block a service depending on the policy.

The gateway service node and the DPI device may enforce policies that are dependent on one another. The UPM system coordinates the policy enforcement between the gateway service node and the DPI device based on their policy dependencies. For example, if the DPI device allows a video service for a subscriber, a policy may include increasing the bandwidth, if needed, for the video service. However, that bearer level policy may be enforced by the gateway service node. First the bearer level bandwidth needs to be increased, then the bandwidth increase for the video service can take effect. The UPM system is notified of the video service packet detected by the DPI device as an event trigger, and the UPM system sends a message to the gateway service node to change the QoS policy to increase bandwidth for the subscriber (bearer). Policy dependencies between the gateway service node and the DPI device may be enforced both ways, so an event detected by the gateway service node, such as a change in location, may cause a policy change enforced by the DPI device, which is facilitated by the UPM system. Furthermore, the UPM system facilitates policy coordination when the DPI device and the gateway service node are connected to the UPM system through two different interface sessions, which may be different 3GPP Gx sessions that are for the same subscriber and his/her mobile data session.

FIG. 1 illustrates a UPM system 100. The UPM system 100 includes a policy decision point (PDP) 101 that interacts with multiple PEPs, such as PEPs 130 and 131, to coordinate policy enforcement between the PEPs 130 and 131. The PDP 101 may include a session manager module 110, a notification manager module 111 and a coordination engine 112. The system 100 may include a data storage 120. The data storage 120 may include a database or another type of data storage system that stores any information used by the UPM system 100. Examples of some of the information stored in the data storage 120 may include policies, policy change rules, and session information. The UPM system 100 may comprise hardware, machine readable instructions or a combination of hardware and machine readable instructions. The machine readable instructions may be stored on a storage device and executed by one or more processors.

Network traffic 140 for one or more networks may be received by the PEPs 130 and 131. The PEPs 130 and 131 may enforce different polices for the network traffic 140, such as user or bearer QoS polices and service QoS policies, etc. The session manager 110 establishes interface sessions 132 and 133 with the PEPs 130 and 131, respectively. Session information is stored in the data storage 120 for each interface session 132 and 133. The session information may include one session identifier, and one or more subscriber identifiers, etc. The interface sessions 132 and 133 may be for the same subscriber and carry policy-related information for traffic for the same subscriber. The interface sessions 132 and 133 may use a protocol to communicate between the PDP 101 and the PEPs 132 and 133. In one example, the interface sessions 132 and 133 are Gx sessions as described in further detail below.

The Gx sessions are for policy interfaces between a GGSN or a PGW and a policy decision point (PDP) in a GPRS network.

The notification manager module 111 sends and receives messages from the PEPs 130 and 131. For each of the PEPs 130 and 131, the notification manager module 111 may subscribe to event trigger notifications for particular events that can be detected by the PEPs 130 and 131. The events may be associated with the policies enforced by the PEPs 130 and 131 and the conditions for triggering enforcement of different policies. For example, an event may be detection of a packet for a particular service, or a change in location of a subscriber, or a change in QoS tier for a subscriber. Many more types of events may be subscribed to by the notification manager module 111. When, these events are detected, a policy change may be facilitated by the PDP 101. For example, the PDP 101 receives an event trigger notification from PEP 130 via interface session 132. The coordination engine 112 determines whether the event is associated with a policy enforced by the PEP 131 and determines whether the policy change rules indicate to change a policy enforced by the PEP 131. If so, a message is sent to the PEP 131 via interface session 133 to initiate a policy change.

Figure 2:
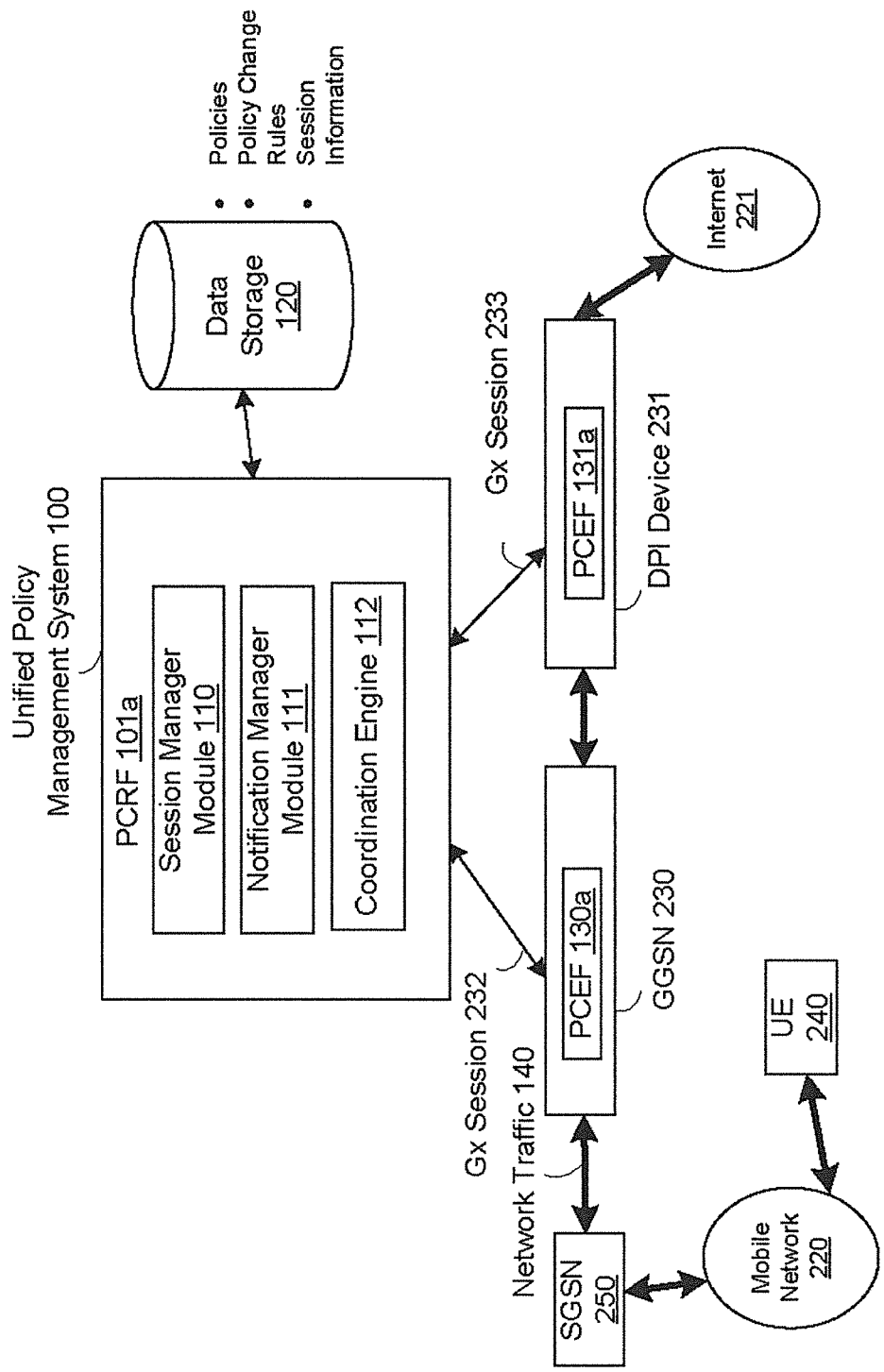
FIG. 2 illustrates a UPM system in a general packet radio system network.

FIG. 2 shows an example of the UPM system 100 for a GPRS network. For example, PEP 130 is for GGSN 230, and PEP 131 is for DPI device 231. The PEPs 130 and 131 may be PCEFs and are shown as PCEFs 130a and 131a. The GGSN 230 is a gateway service node between a mobile network 220, such as GSM, and the Internet 221 or some other IP network. PCEF 130a in the GGSN 230 may enforce subscriber-based QoS policies or other types of policies. For example, user equipment (UE) 240 is for a particular subscriber and maximum uplink and downlink bandwidths are enforced for the UE 240. PCEF 131a in the DPI device 231 may enforce service layer policies based on information detected in received packets from, for example, the mobile network 220. Also, Gx sessions 232 and 233 may be established by the session manager 110 for communicating between the PDP 101 and the PCEFs 130a and 131a in the GGSN 230 and DPI device 231. The PDP 101 may be a policy and charging rules function (PCRF) 101a as shown in FIG. 2.

Serving GPRS support node (SGSN) 250 delivers data packets from and to mobile stations within its geographical service area. Its tasks include packet routing and transfer, mobility management (attach/detach and location management), logical link management, and authentication and charging functions. Instead of GGSN 230 and SGSN 250, the system shown in FIG. 2 may include a PGW for the GGSN 230 and a Serving Gateway (SGW) instead of the SGSN 250 for a 4G LTE network.

The coordination engine 112 facilitates policy management between the GGSN 230 and the DPI device 231. For example, the GGSN 230 may detect a radio access technology (RAT) change from 3G to 2G and sends a notification event trigger via Gx session 232 to the notification manager module 111. The coordination engine 112 determines whether the event impacts a service received by the UE 240 for the subscriber. If so, a message is sent via Gx session 233 to the PCEF 131a in the DPI device 231 to change a policy enforced at the DPI device 231, such as reduce video service quality from high definition to standard definition. If the policy is changed, an acknowledgment is sent back to the PCRF 101. The coordination engine 112 may send a message via Gx 232 to PCEF 130a that the video service was downgraded, and the PCEF 130a may reduce the bandwidth for the UE 240. In another example, a change in location or change in subscriber tier may cause event notifications to be sent to the PCRF 101a and subsequently may result in the PCRF 101a facilitating a policy change in a PCEF that did not detect the event.

Figure 3:
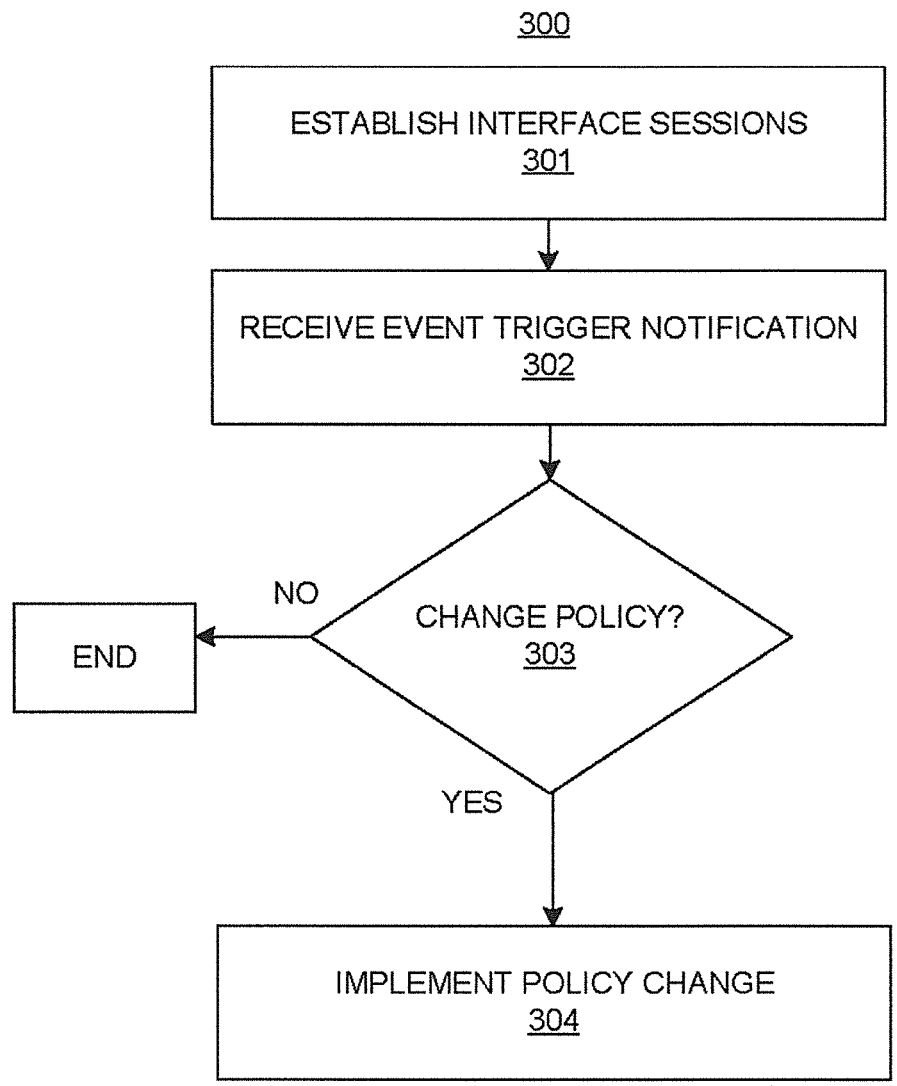
FIGS. 3, 4 and 5A-B illustrate methods.

FIG. 3 illustrates a method 300. The method 300 is described with respect to the UPM system 100 shown in FIGS. 1 and 2 by way of example. At 301, interface sessions are established between the PDP 101 and the PEPs 130 and 131. The session manager module 110 may facilitate session establishment. As part of 301, an initial policy rule may be provisioned to the PEPs.

At 302, the notification manager module 111 receives an event trigger notification from one of the PEPs 130 or 131. The event trigger notification identifies a particular event detected by a PEP. For example, PEP 130 detects a location change of a subscriber and send a notification to the PDP 101.

At 303, the coordination engine 112 determines whether a policy change is to be performed by another PEP in response to the detected event. For example, the coordination engine 112 queries the data storage 120 for policies enforced by the PEP 131 that may be changed as a result of the event detected by PEP 130. Policies and policy change rules stored in the data storage 120 may indicate whether a policy change is needed based on the detected event.

At 304, if the coordination engine 112 determines a policy change is to be performed at the PEP 131, a message is sent to the PEP 131 to implement the policy change. The PDP 101 may wait for confirmation that the policy change was implemented at the PEP 131. If the confirmation is received, a message may be sent to the PEP 130 from PDP 101 to notify of the policy change at PEP 131. PEP 130 may make a policy change as well based on the confirmation if warranted.

Figure 4:
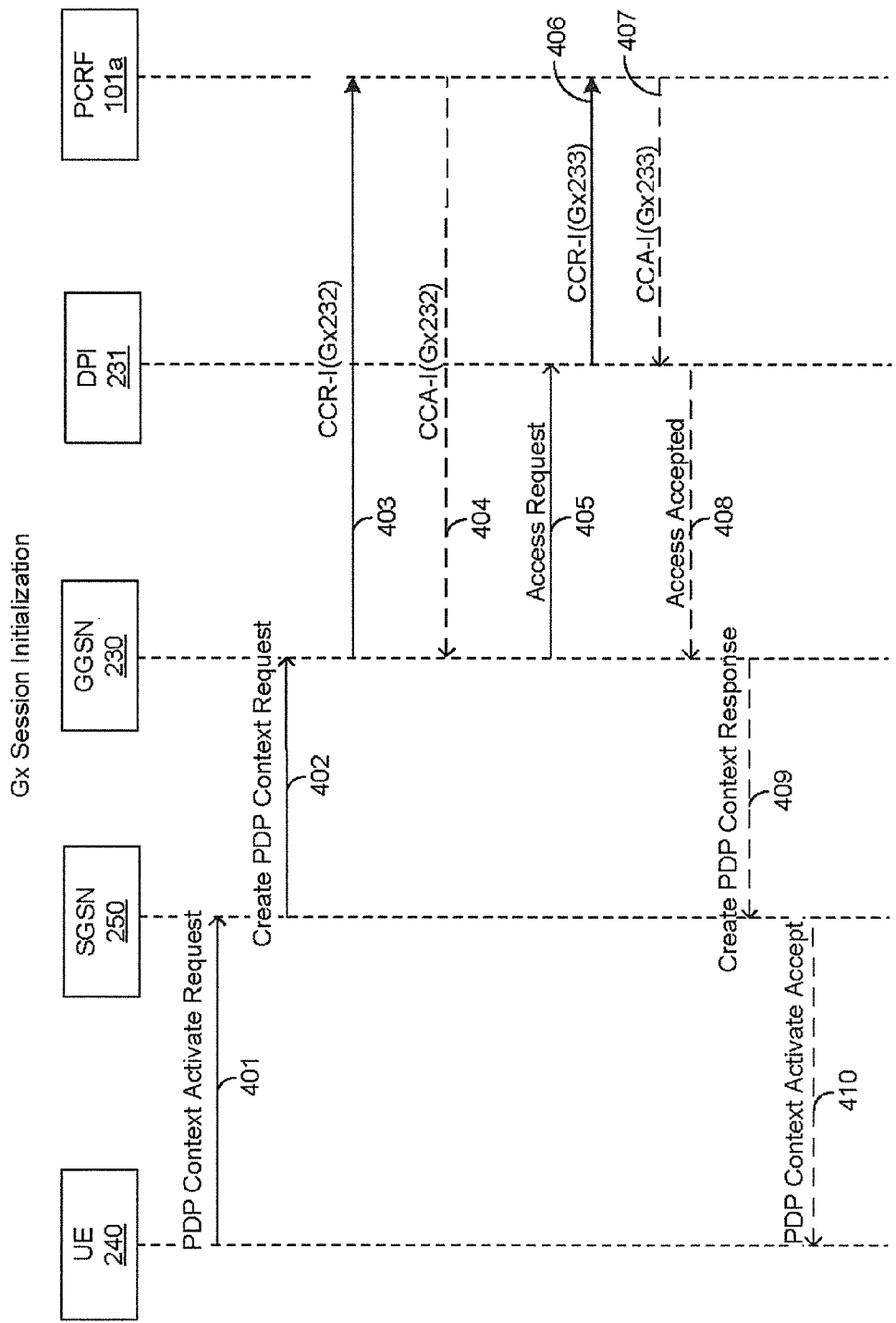

FIG. 4 illustrates establishing Gx sessions 232 and 233 and is described by way of example with respect to FIG. 2. 401-404 describe establishing Gx session 232 between GGSN 230 and PCRF 101a. At 401, UE 240 sends a Packet Data Protocol (PDP) context activate request to SGSN 250. At 402, SGSN 250 sends a create PDP context request to GGSN 230. At 403, the GGSN 230 sends a Credit Control Request (CCR-I because it's "Initial_Request") to PCRF 101a to establish the Gx session 232. At 404, the PCRF 101a sends a Credit Control Answer (CCA-I) to the GGSN 230 to acknowledge the CCR-I. At this point, Gx 232 may be established.

405-410 describe establishing Gx session 233 between DPI device 231 and PCRF 101a. At 405, the GGSN 230 sends an access request to the DPI device 231. At 406, the DPI device 231 sends CCR-I to the PCRF 101a. At 407, the PCRF 101a sends CCA-I to the DPI device 231 to establish Gx session 233. At 408, the DPI device 231 sends an access accept message to the GGSN 230. At 409, the GGSN 230 sends a create PDP context response to the SGSN 250, and at 410, the SGSN 250 send a PDP context activate accept to the UE 240.

Figure 5A:
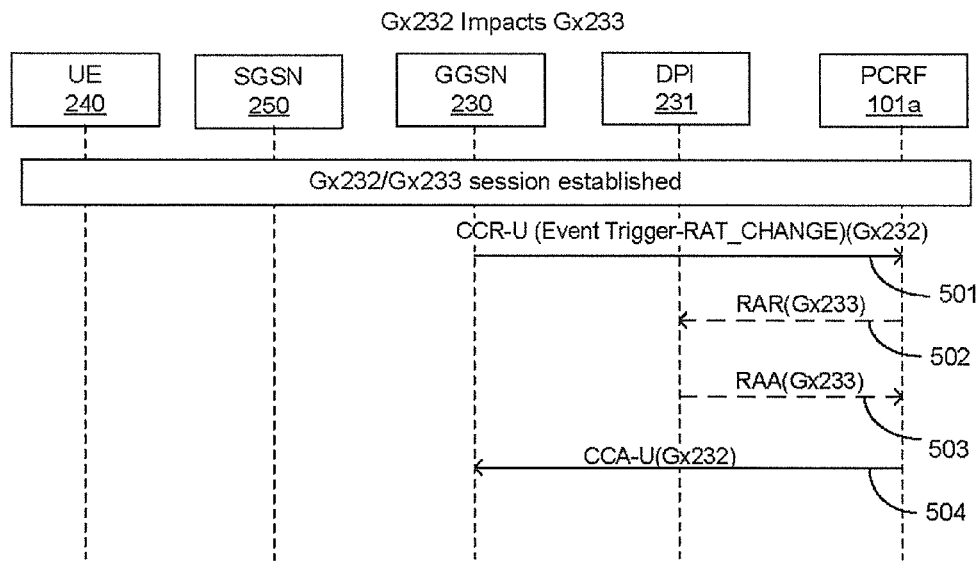

FIG. 5A shows an example of the PCRF 101a in the UPM 100 receiving notification of an event detected at the GGSN 230, and facilitating a policy change at the DPI device 231. For example, Gx 232 and 233 are established as described in FIG. 4. At 501, the GGSN 230 sends an event trigger notification (e.g., CCR update request shown as CCR-U) via Gx 232 to the UPM system 100. The event trigger notification for example notifies of a RAT change. The UPM 101 may decide a policy change is needed at the DPI device 231 based on the RAT change. The UPM system 101 decides to provision a policy to the DPI device 231 to effect a policy change. At 502, the UPM system 101 includes the policy change in Re-Auth-Request (RAR) to the DPI device 231. At 503, the DPI device 231 sends a Re-Auth-Answer (RAA) message to the UPM system 100 to indicate that the policy change was implemented. At 504, the UPM system 100 sends a response (CCA-U) to the GGSN 250 that the policy change was implemented via Gx 232.

Figure 5B:
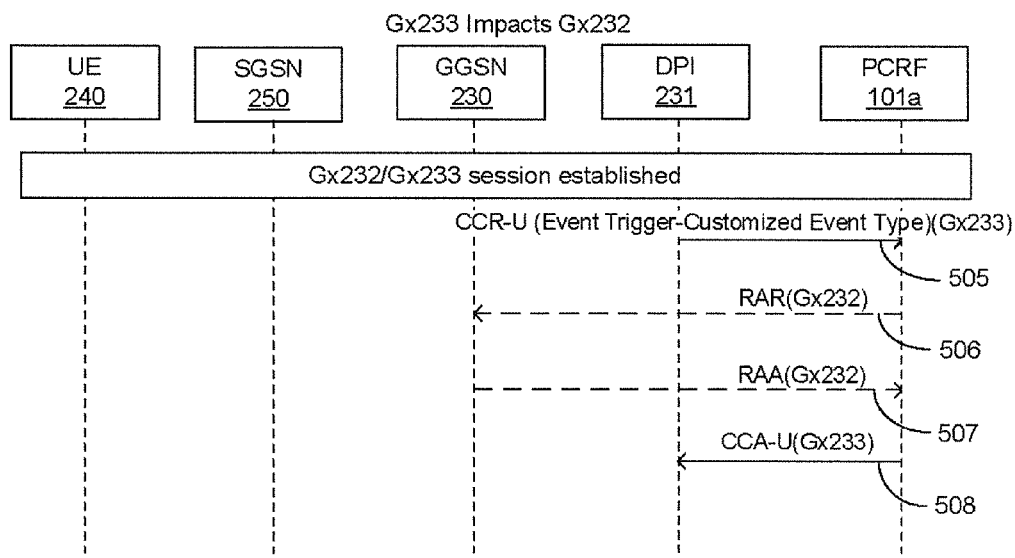

505-508 in FIG. 5B show an example of the PCRF 101a in the UPM system 100 receiving notification of an event detected at the DPI device 231, and facilitating a policy change at the GGSN 230. 505-508 is similar to 501-504 in FIG. 5A, except the policy change is implemented at the GGSN 230 based on an event detected at the DPI device 231.

Figure 6:
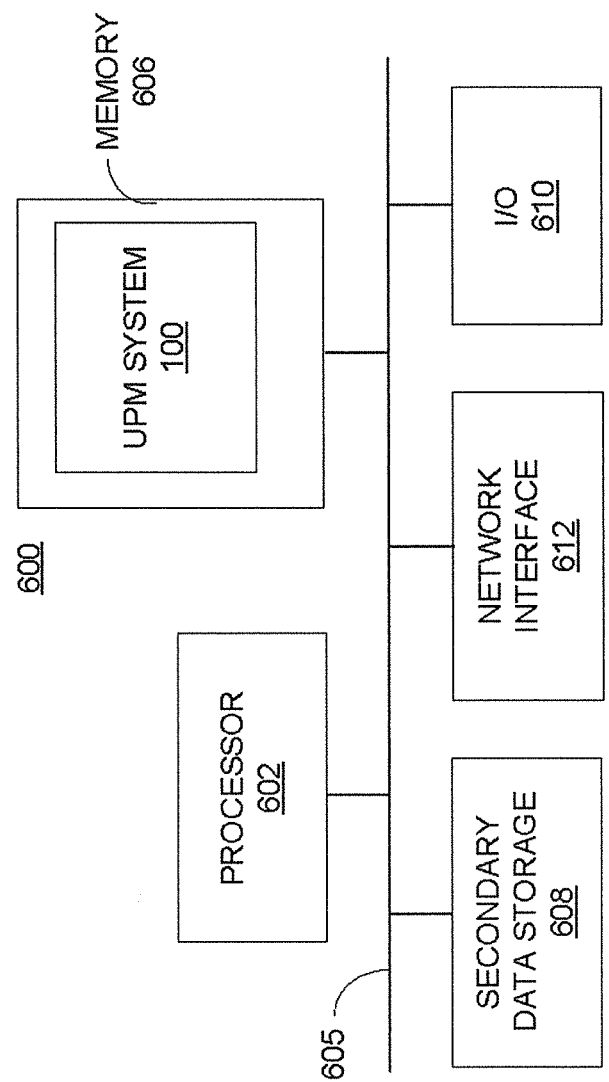
FIG. 6 illustrates a computer system that may be used for the method and systems.

FIG. 6 shows a computer system 600 that may be used with the embodiments described herein. The computer system 600 represents a generic platform that includes components that may be in a server or another computer system. The computer system 600 may be used as a platform for the data storage system 100. The computer system 600 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 605. The computer system 600 also includes a main memory 606, such as a random access memory (RAM), where the machine readable instructions and data for the processor 602 may reside during runtime, and a secondary data storage 608, which may be non-volatile and stores machine readable instructions and data. For example, machine readable instructions for the UPM system 100 may reside in the memory 606 during runtime. The memory 606 and secondary data storage 608 are examples of computer readable mediums.

The computer system 600 may include an I/O device 610, such as a keyboard, a mouse, a display, etc. For example, the I/O device 610 includes a display to display drill down views and other information described herein. The computer system 600 may include a network interface 612 for connecting to a network. Other known electronic components may be added or substituted in the computer system 600.

While the embodiments have been described with reference to examples, various modifications to the described embodiments may be made without departing from the scope of the claimed embodiments.

What is claimed is:

1. A Unified Policy Management (UPM) system comprising:
at least one processor; and
a non-transitory computer readable medium storing instructions that when executed by the at least one processor cause the at least one processor to:
establish interface sessions with a plurality of policy enforcement points (PEPs), wherein the interface sessions are for a same subscriber;
receive an event trigger notification from a first PEP of the plurality of PEPs via a first interface session of the interface sessions;
determine whether an event identified from the event trigger notification is associated with a policy enforced by a second PEP of the plurality of PEPs;
in response to a determination that the event identified from the event trigger notification is associated with a policy enforced by the second PEP, determine whether the policy enforced by the second PEP is to be changed; and
change the policy to be enforced by the second PEP in response to a determination that the policy enforced by the second PEP is to be changed, by sending a message to the second PEP via a second interface session of the interface sessions to change the policy in the second PEP.

2. The UPM system of claim 1, wherein the instructions are to cause the at least one processor to receive a message from the second PEP indicating that the policy has been changed, and to send a message to the first PEP that the policy has been changed.

3. The UPM system of claim 1, wherein the first PEP is in a gateway service node.

4. The UPM system of claim 1, wherein the first PEP is in a gateway service node and the second PEP is in a deep packet inspection device.

5. The UPM system of claim 1, wherein the first PEP is to perform bearer level quality of service policy enforcement.

6. The UPM system of claim 1, wherein the second PEP is to enforce service policies.

7. The UPM system of claim 1, wherein the instructions are to cause the at least one processor to determine whether the policy enforced by the second PEP is changed based on policy change rules stored in a data storage device at the UPM system.

8. A non-transitory computer readable medium storing machine readable instructions executable by at least one processor to:
establish interface sessions between a Unified Policy Management (UPM) system and a plurality of policy enforcement points (PEPs) that enforce policies;
receive an event trigger notification from a first PEP of the plurality of PEPs via a first interface session of the interface sessions;
determine whether an event identified from the event trigger notification is associated with a policy enforced by a second PEP of the plurality of PEPs;
in response to a determination that the event identified from the event trigger notification is associated with a policy enforced by the second PEP, determine whether the policy enforced by the second PEP is to be changed; and
change the policy to be enforced by the second PEP in response to a determination that the policy enforced by the second PEP is to be changed, by sending a message to the second PEP via a second interface session of the interface sessions to change the policy in the second PEP, wherein the first and second interface sessions are for a same subscriber.

9. The non-transitory computer readable medium of claim 8, wherein the machine readable instructions are executable by the at least one processor to:
establish the first and second interface sessions by exchanging messages with the first and second PEPs, respectively.

10. The non-transitory computer readable medium of claim 8, wherein the policy change is associated with a bearer level quality of service policy or a service policy.

11. The non-transitory computer readable medium of claim 8, wherein the machine readable instructions are executable by the at least one processor to:
receive a message from the second PEP via the second interface session indicating that the policy has been changed; and send a message via the first interface session to the first PEP that the policy has been changed.

12. The non-transitory computer readable medium of claim 8, wherein the first PEP is in a gateway service node to facilitate communication between a general packet radio service network and an external packet switched network to enforce service policies.

13. The non-transitory computer readable medium of claim 8, wherein the first PEP is to enforce bearer level quality of service policies.

14. The non-transitory computer readable medium of claim 8, wherein the second PEP is to enforce service policies.

15. A method comprising:
establishing sessions between a Unified Policy Management (UPM) system and first and second policy enforcement points (PEPS) via first and second interface sessions, respectively;
receiving, by the UPM system, an event trigger notification from the first PEP via the first interface session;
determining, by at least one processor of the UPM system, whether an event identified from the event trigger notification is associated with a policy enforced by the second PEP;
determining whether the policy enforced by the second PEP is to be changed; and
changing the policy to be enforced by the second PEP in response to a determination that the policy enforced by the second PEP is to be changed, by sending a message from the UPM system to the second PEP via the second interface session to change the policy in the second PEP.

* * * * *